US006068021A

United States Patent [19]

Rausch

[11] Patent Number: 6,068,021

[45] Date of Patent: May 30, 2000

[54] DIRECTIONAL CONTROL VALVE

[75] Inventor: Georg Rausch, Lohr, Germany

[73] Assignee: Mannesmann Rexroth AG, Lohr, Germany

[21] Appl. No.: 09/117,865

[22] PCT Filed: Feb. 6, 1997

[86] PCT No.: PCT/DE97/00237

§ 371 Date: Sep. 21, 1998

§ 102(e) Date: Sep. 21, 1998

[87] PCT Pub. No.: WO97/30306

PCT Pub. Date: Aug. 21, 1997

[30] Foreign Application Priority Data

Feb. 16, 1996 [DE] Germany ........................... 196 05 862

[51] Int. Cl.[7] ........................................ G05D 7/00

[52] U.S. Cl. ........................................ 137/489; 137/501

[58] Field of Search ........................................ 137/489, 501

[56] References Cited

U.S. PATENT DOCUMENTS

| | | | |
|---|---|---|---|
| 2,594,626 | 4/1952 | Earle . | |
| 3,439,696 | 4/1969 | Valentine . | |
| 4,368,872 | 1/1983 | Machat | 137/489 X |
| 4,791,950 | 12/1988 | Pedersen . | |
| 4,809,746 | 3/1989 | Wolfges | 137/501 |

FOREIGN PATENT DOCUMENTS

| | | | |
|---|---|---|---|
| 1 210 120 | 3/1960 | France . | |
| 1 500 182 | 6/1969 | Germany . | |
| 1 650 321 | 10/1970 | Germany . | |
| 37 01 572 A1 | 8/1988 | Germany . | |
| 59-112316 | 6/1984 | Japan | 137/489 |
| 1096434 | 12/1967 | United Kingdom . | |

*Primary Examiner*—Gerald A. Michalsky
*Attorney, Agent, or Firm*—Oliff & Berridge, PLC

[57] ABSTRACT

A 2-way fitted valve (2) includes a main piston (6) guided in a valve bush (4) and allowing flow of a hydraulic fluid therethrough, whereby an inlet port (B) is connected with an outlet port (A). In the region of a throttle point (8) of the main piston (6) an effective surface (D-d) is provided, so that due to the pressure drop at the throttle point (8) a pressure force acts on the main piston (6) such as to urge it in the direction towards its home position.

11 Claims, 3 Drawing Sheets

DIRECTIONAL CONTROL VALVE

DESCRIPTION

The invention relates to a directional control valve and to pressure reducing valves and flow control valves provided with a like directional control valve.

In FIG. 1 an embodiment of such a directional control valve is represented, which is designed as a 2-way fitted valve 2. It comprises a valve bush 4 wherein a main piston 6 is guided such as to be axially displaceable. The valve bush 4 may be secured in a control block in a known manner and thus form part of a hydraulic circuit which shall be explained in more detail hereinbelow.

The valve bush 4 comprises two ports A and B, with port B customarily being the inlet port and having the form of a radially or laterally branching port. Outlet port A is arranged coaxially with the main piston 6. At the peripheral wall of the main piston 6, radial bores 8 are provided whereby port B may be connected with port A in the case of a flow through the main piston 6. In the shown embodiment, port B and the radial bores 8 are each designed as a bore star. In the home position represented in FIG. 1, the main piston 6 is biased by means of a spring 10 towards a stop position wherein the connection from B via the main piston 6 to the outlet port A is open. I.e., in the home position of the main piston 6 the hydraulic fluid enters in a radial direction through port B, enters through the radial bores 8 into the main piston 6, and is deflected by approx. 90° towards the port A.

By a suitable design of the control block and of the valve cover (not shown) it is possible to supply a control pressure to the spring side of the main piston 6, whereby the latter is additionally biased in the direction towards its home position. This control pressure may, for example, be applied by way of a control pressure line branching off from outlet port A.

The like valve arrangements in 2/2-directional control valve design belong to the category of the so-called logic components utilised as a main stage, e.g. for pressure reducing valves, pressure control valves, pressure switching valves etc. This main stage may be associated with pilot control valves which way, for example, be integrated on the valve cover, in the valve cover, or arranged in another location of a control block.

In FIG. 3 an exemplary switching circuit is represented wherein the fitted valve 2 represents a component of a pilot operated pressure reducing valve 12. The latter essentially consists of the fitted valve 2 and a direct operated pilot valve 14 designed as a pressure reducing valve. The flow direction at the fitted valve 2 is from port B towards port A, with a free flow being insured in the home position in accordance with the representation of FIG. 1.

The pressure at the outlet port A is tapped via a control line 16 and supplied via two nozzles 18 and 20 arranged in series towards the spring side of the main piston 8. The desired output pressure at the outlet port A may be adjusted through the spring of the pilot valve 14. This output pressure acts on the bottom side of the main piston 6 and is supplied via the control line 16 and the nozzles 18 and 20 to the spring side of the main piston 6. As long as the pressure at the outlet port A is lower than the input pressure adjusted at the pilot valve 14, the main piston 6 will, due to the spring 10, remain in its home position wherein the connection between A and B is controlled fully open. When the pressure at the outlet port A—and thus the one prevailing between the two nozzles 18 and 20—exceeds the preset value, the pilot valve 14 is opened, so that control fluid flows via the pilot valve 14 towards a tank T.

Due to the resulting flow of control fluid, a pressure gradient is created at the nozzle 18, so that due to the control fluid pressure difference between the bottom side of the piston and the spring side, the main piston 6 is displaced upwardly (view of FIG. 1) from its home position against the tension of spring 10, and the connection from B to A is controlled closed until a pressure equilibrium occurs. In this condition only such an amount of hydraulic fluid may flow from port B through the main piston 6 to port A that the pressure set at A by means of the pilot valve 14 will not be exceeded. In case a driven unit connected at the outlet port A does not draw hydraulic fluid, the main piston 6 is taken into its closing position in which the connection between B and A is closed so far that only the required flow of control fluid arrives at port A. During the control function, control fluid constantly flown via the pilot valve 14 to the tank T. In the embodiment represented In FIG. 3, the two nozzles 18 and 20 as well as the pilot valve 14 are formed in or at the valve cover 22.

Upon a flow through the fitted valve 2, a flow pulse acts on the bottom 24 of the main piston 6, so that a pulse force $F_I$ counteracting the spring force $F_1$ applied by the spring 10 is applied on the latter (see FIG. 1). In the case of high flows, the pulse force $F_I$ may happen to be greater than the spring force $F_1$, so that the main piston will be moved into its closing position merely by the impulse of the flowing hydraulic fluid. In this case the performance limit of the fitted valve 2 has been reached which limits the maximum conveyable flow. I.e., when the performance limit is exceeded, the flow cannot be further increased.

In FIG. 2 the output pressure at the outlet port A over the flow rate is represented, with the vertical phantom lines representing the performance limits manifesting with the use of different springs 10. In the embodiment shown in FIG. 2, the performance limit with use of a 4-bar spring is around 120 l/min, so that a stronger spring must be used for higher flow rates.

A stronger spring 10 does, however, harbor a number of drawbacks, such as lack of responsiveness and lacking sensitivity of control, which will come to bear particularly in the case of low flows and which are not acceptable. The minimum adjustable pressure at port A disadvantageously increases with the use of stronger springs.

In contrast, the invention is based on the object of furnishing a directional control valve as well as pressure reducing valves/flow control valves provided with a like directional control valve, which have an increased performance limit at minimum expense in terms of device technology and which furthermore present sufficient responsiveness even in the case of low flows.

This object is attained with respect to the directional control valve by having the main piston provided with a differential area effective surface, whereby upon flow therethrough, a pressure force component acts on the main piston such as to urge it in the direction towards its home position. Furthermore, the pressure at the outlet port is supplied to a spring side of the main piston via a nozzle, and the pressure at the spring side may be limited by way of a pilot control valve. Also, a flow control valve including an adjustable throttle valve is arranged as a pressure compensator, wherein the pressure downstream of the throttle valve is supplied to the spring side of the main piston.

Due to the measure of forming upstream of a throttle point of the main piston a differential area whereby a force component acts on the main piston such as to urge it in the direction towards its home position upon flow therethrough, the pulse force $F_I$ acting on the main piston may be compensated at least in part, so that the performance limit is increased in comparison with the conventional solutions without the necessity of utilising a stronger spring. This additional force acting In the opening direction on the differential area effective surface is caused due to the pressure drop occurring in the flowing hydraulic fluid upon flow through the radial bores. Herein it is particularly preferred if the effective surface is designed as a radial shoulder at the outer periphery of the main piston, whereby the latter is steppingly expanded. In this embodiment of the effective surface, a corresponding design of the valve bush bore is, of course, also carried out.

If the main piston is designed with a radial bore star, the radial shoulder is preferably arranged in the region between the radial bore star and the bottom side of the piston.

It was found in extensive pre-trials that a differential area of 3–10% in relation to the smaller main piston diameter ensures optimum results.

For reasons of production technology it is preferred to form the radial shoulder (differential area) by means of an annular groove, with the radial shoulder constituting a front surface of the annular groove. The other front surface is in this case preferably formed as an inclined shoulder.

Manufacture, particularly grinding of the valve bore is facilitated if the corresponding steppingly expanded portion of the valve bush is also formed by means of a peripheral groove, one front surface of which forms the steppingly expanded portion.

Particularly advantageous applications of the 2-directional control valve according to the invention result in the case of a pilot operated pressure reducing valve which limits the pressure at the spring side of the main piston, and a flow control valve which is arranged as a pressure compensator.

Further advantageous embodiments of the invention form the subject matters of the remaining appended claims.

Next, preferred embodiments of the invention shall be explained in detail by referring to schematic drawings, wherein:

FIG. 4 represents a partial sectional view of a fitted valve 2 according to the invention, with identical reference symbols in the following representations indicating components analogous to those of FIG. 1.

The fitted valve 2 according to the invention may be employed e.g. in a pilot operated pressure reducing valve according to FIG. 3 or a flow control valve according to FIG. 5, which shall be explained below.

Figure 3:
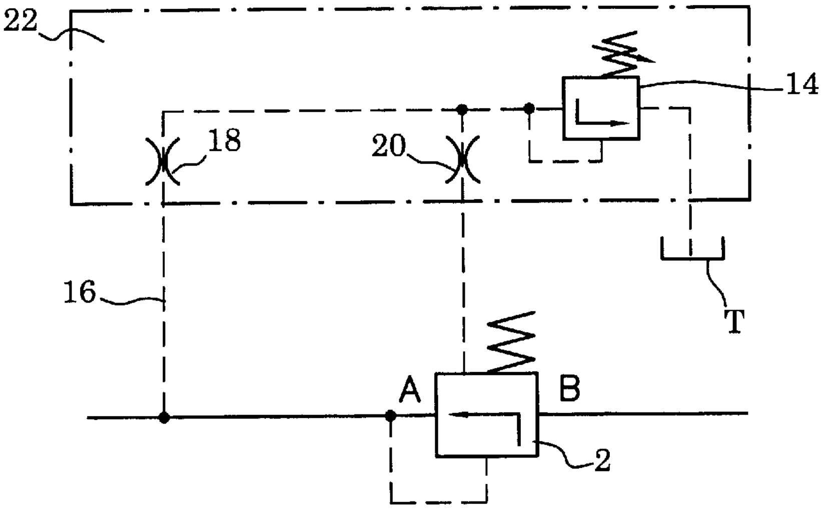
FIG. 3 shows a circuit wherein the fitted valve of FIG. 1 is the main stage of a pressure reducing valve.
Figure 4:
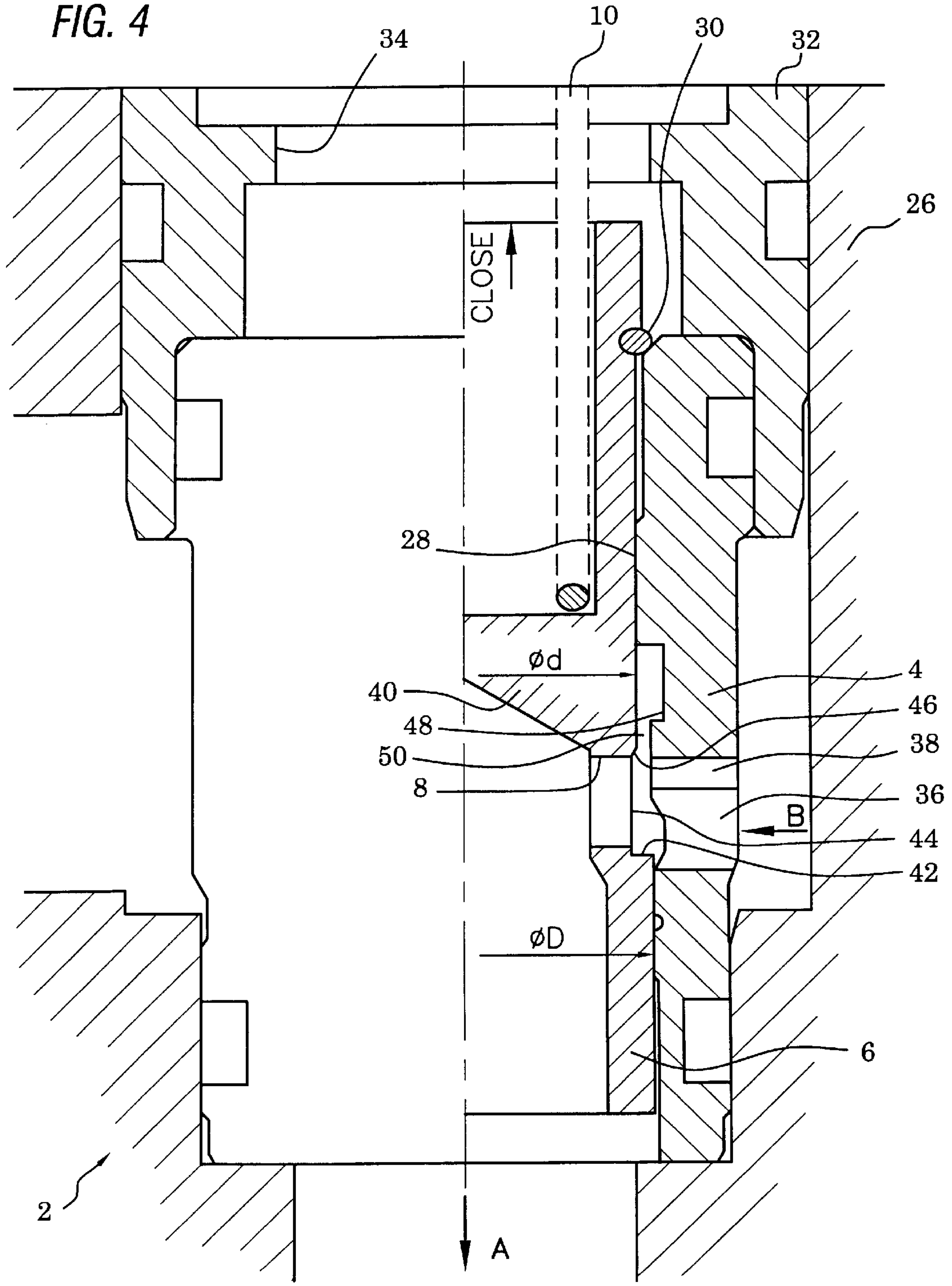
FIG. 4 shows a fitted valve according to the invention, which is applicable in a circuit according to FIG. 3.

In accordance with FIG. 4, the fitted valve 2 of the invention comprises a valve bush 4, in the valve bore 28 of which a main piston 6 is guided such as to be axially displaceable. The latter is biased into its home position by a spring 10 wherein a stop ring 30 secured to the outer periphery of the main piston 6 contacts a stop surface of the valve bush 4. The valve bush 4 is secured in a control block 26 by means of a mounting bush 32 and closed with a valve cover (not shown), in or at which the further components indicated in FIGS. 3 and 5 may be arranged. The mounting bush 32 includes an internal bore arranged coaxially with the valve bore 28 and having a diameter such that the spring-side portion (top in FIG. 4) of the main piston 6 may plunge into it without colliding.

Figure 1:
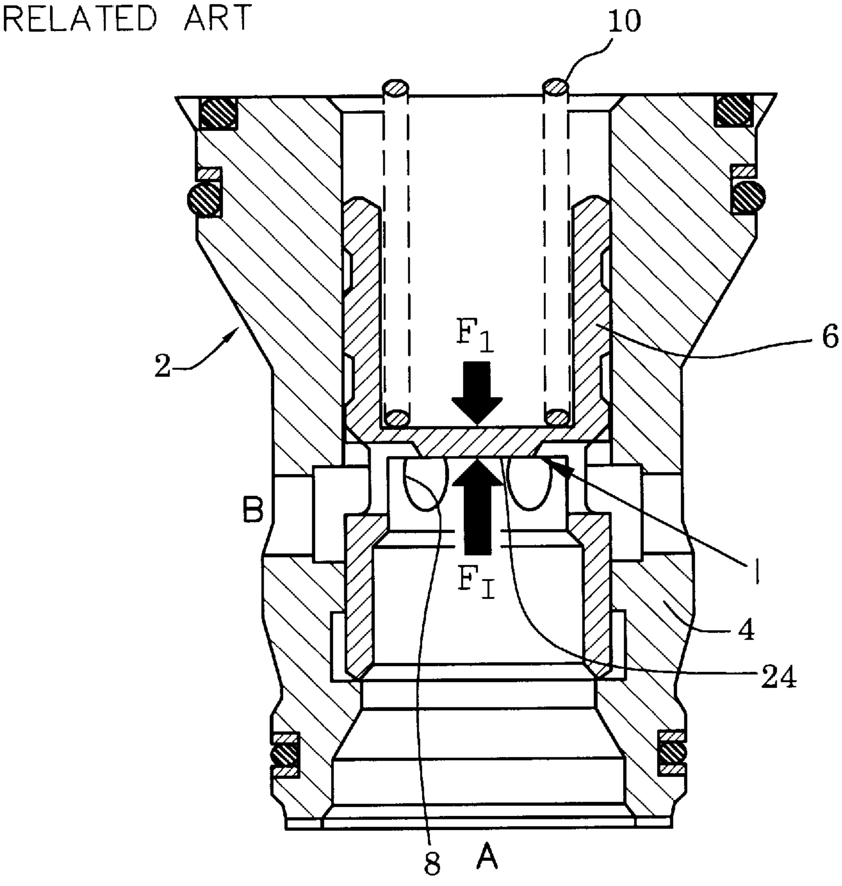
FIG. 1 RELATED ART
FIG. 1 shows a sectional view of a fitted valve known from the prior art.
Figure 2:
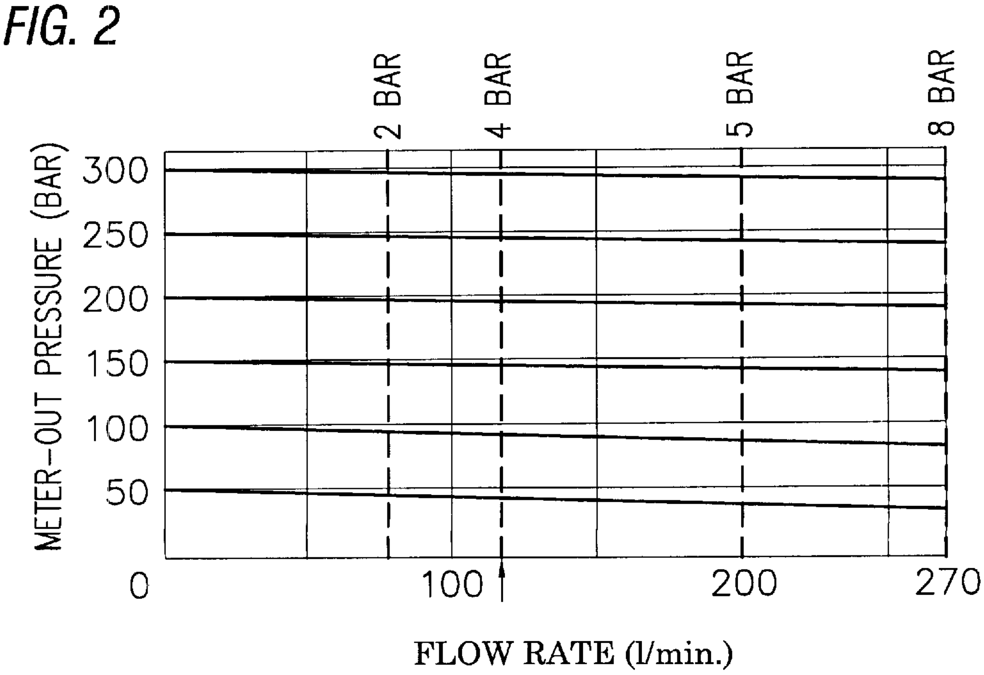
FIG. 2 shows a diagram representing the performance limit of the fitted valve of FIG. 1 as a function of a valve spring used.

The valve bush 4 might have a fitting design in accordance with FIG. 1.

An inlet port B is formed at the valve bush 4 as a bore star, i.e. a plurality of radial bores 36. In addition a plurality, preferably two, smaller bores 38 are provided in staggered arrangement.

By means of the smaller bores 38 a fine control is performed at smaller flows when the connection from B to A is controlled open.

As can furthermore be taken from FIG. 4, the main piston 6 is designed as a hollow piston with a piston bottom 40 formed approximately in the center region thereof. The spring 10 attacks at this piston bottom 40 in order to bias the main piston 6 into its opened position (FIG. 4).

Underneath the piston bottom 40, i.e. in the portion of the piston jacket facing away from the spring 10, radial bores 8 are formed wherathrough the hydraulic fluid may enter from the port B (bores 36, 38) into the piston cavity. In the same manner as is represented in FIG. 1, these radial bores 8 are designed as a bore star extending through the jacket of the main piston 6.

In the home position of the main piston 6 as represented in FIG. 4, the bores 36, 38 of port B any the radial bores 8 overlap so that the connection between the ports B and A is controlled fully open.

Underneath the radial bores 8 (view of FIG. 4) the main piston 6 is expanded from a spring-side main piston diameter d to a main piston diameter D via a radial shoulder 42. The radial shoulder 42 is formed by means of an annular groove 44, into the base of which the radial bores 8 open, and the other front surface of which is designed as an inclined shoulder 46.

The valve bore 28 of the valve bush 4 is radially expanded above (view of FIG. 4) the port B in accordance with the diameter ratio d/D, with a peripheral groove 48 formed in the region of the radially expanded portion whereby the lower, expanded portion of the valve bore (diameter D) is separated from the upper, narrower portion of the valve bore 28 (diameter d).

The peripheral groove 48 and the annular groove 44 are provided for reasons of production technology because the surfaces (peripheral surface of the main piston 6; inner peripheral surface of the valve bore 28) adjacent the two grooves are microfinished by grinding, and by means of the grooves, the necessity of advancing the grinding disk as far as the radial shoulders during grinding of the smaller piston diameter, or of the larger valve bore diameter, is avoided.

In the home position represented in FIG. 4, the inclined shoulder 46 of the annular groove 44 is arranged at an axial distance from the neighboring front surface of the peripheral groove 48, so that the two grooves 44, 48 do not overlap in the home position.

In the region between the two grooves 44, 48 a ring gap 50 is formed between main piston 6 and valve bush 4.

When hydraulic fluid flows through the fitted valve 2, a pressure drop is created along the radial bores 8 and has the result that a pressure force acting on the main piston 6 in the direction towards the home position acts on the differential area, which is characterised by the difference D-d of diameters, at the radial shoulder 42. I.e.,.this pressure force acts in addition to the force of the spring 10 in the opening direction, whereby the performance limit is raised.

The magnitude of the force F depends on the ratio d/D of diameters on the one hand and on the pressure drop in the radial bores 8 on the other hand. For this reason on will aspire to realise a minimum possible depth of the annular groove 44 inasmuch as the pressure drop also depends on the remaining wall thickness of the main piston 6. The same applies to the depth of the peripheral groove 48 and to the ring gap 50 which should equally be as slight as possible so that the hydraulic fluid upon flowing through the fitted valve 2 cannot flow through the ring gap 50 into the peripheral groove 48 in a considerable degree, to thereby ensure that a suitable pressure acts at the outer periphery of the main piston 6, and the pressure drop along the radial bores thus also presents the required magnitude.

In accordance with FIG. 3, the fitted valve 2 installed in a control block is provided with a valve cover 22 in which the above described components, such as the nozzles 18, 20 and the pilot valve 14, may be provided.

In the shown home position (FIG. 4) there is a flow through the fitted valve 2, with the effect of the spring 10 being Intensified by the force acting on the differential area, which exists owing to the pressure drop in the radial bores 8. In this case, the performance limit is correspondingly shifted upwards in accordance with the additionally applied pressure force, so that a greater flow may be conveyed. When the preadjusted pressure is reached at the spring side of the main piston 6, the pilot valve 14 opens so that the control fluid flows towards the tank T and a pressure drop resulting in a closing motion of the main piston (upwardly in FIG. 4) is created at the throttle 18. Due to this closing motion the bores 36 and 38 are controlled closed, so that the connection from B to A is throttled correspondingly, and a pressure corresponding to the pilot valve setting manifests at the outlet port A.

As was already mentioned at the beginning, the fitted valve 2 is in its closing position when the driven unit connected to the port A does not draw hydraulic fluid. In a case of consumption of hydraulic fluid, the pressure at the outlet port A will also drop, so that the pilot valve 14 controls the connection to the tank T closed, and the main piston 6 is taken back in the direction towards its home position due to the control pressure building up at the spring side. The smaller bores 38 are controlled open first, which thus become effective at low flow rates and enable fine control of the driven unit at good responsiveness.

In the case of higher flows, the larger-diameter bores 36 are also controlled open until the main piston 6 is moved back into its home position (FIG. 4) and the maximum conveyable flow has been reached, which is limited by the above described performance limit.

Figure 5:
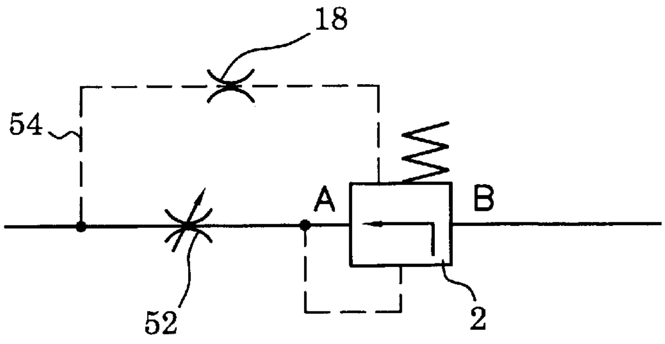
FIG. 5 shows another embodiment wherein the fitted valve according to FIG. 4 is employed for a flow control valve.

FIG. 5 schematically represents another embodiment of a fitted valve according to FIG. 4. Herein the fitted valve 2 is employed in 2-way flow control, with a throttle point for load compensation being associated with a pressure compensator constituted by the fitted valve 2. The throttle point has the form of an adjustable throttle valve 52 provided downstream of the fitted valve 2.

Downstream of the throttle valve 52, a control line 54 branches off which is routed via a throttle 18 to the spring aide of the main piston. The pressure applied at the outlet port A of the fitted valve 2—like in the above described embodiment—acts on the piston bottom (outlet port side). Accordingly in this embodiment the fitted valve 2 is used in the function of a pressure compensator having a pressure reducing function. In this variation, the fitted valve 2 is opened in the home position, so that the hydraulic fluid flows from port B via fitted valve 2 to A and from there via the throttle valve 52 to the driven unit, e.g. a hydraulic cylinder or a hydraulic motor (not shown). The pressure at the exit from the throttle valve 52 is influenced by means of axial displacement of the main piston 6 and the ensuing modification of cross section of flow in such a manner that the pressure gradient over the throttle valve 52 will always remain constant. This pressure gradient is dependent on the force of the spring at the piston.

If the pressure at the exit from the throttle valve 52 drops owing to a change of load, the pressure in the control line 54, which is supplied to the spring side of the main piston 6 via the nozzle 18 acting as an attenuating member, is reduced accordingly. Due to the pressure reduction at the spring side of the main piston the latter is displaced against the spring bias in the direction towards its closing position, so that the cross section of flow, i.e. the effective cross section of the radial bores 36, is controlled closed. Thus the flow of hydraulic fluid supplied to the throttle valve 52 via the fitted valve 2 is also reduced. The displacement of the main piston 6 takes place until the pressure at the outlet port A and thus also at the entrance of the throttle valve 52 has decreased by the same amount as the pressure at the exit from the throttle valve 52 (control line 54). The pressure gradient over the throttle valve 52 is thus always maintained at a constant value.

In this embodiment, too, the maximum flow conveyable through the fitted valve 2 is increased considerably by upwardly modifying the performance limit in comparison with conventional solutions.

The solution according to the invention thus makes it possible to upwardly modify the performance limit at minimum expense in terms of device technology, so that the fitted valve according to the invention may be employed in a wider range of flow without any change of the spring 10.

I claim:

1. A 2-directional control valve including a main piston guided in a valve bush and allowing flow of a hydraulic fluid therethrough, which enables connection of an inlet port with an outlet port and which is biased into its home position by means of a spring, characterised in that the main piston, upstream of a throttle point, is provided with a differential area effective surface, whereby, upon flow therethrough, a pressure force component acts on the main piston such as to urge it in the direction towards its home position.

2. A 2-directional control valve in accordance with claim 1, characterised In that the effective surface is designed as a radial shoulder at the outer periphery of the main piston, and that the valve bush is steppingly expanded accordingly.

3. A 2-directional control valve according to claim 2, characterised in that the main piston comprises radial bores as throttle point wherethrough the hydraulic fluid may flow from inlet port to outlet port, with the radial shoulder being formed in the region between the radial bores and the piston bottom facing the outlet port.

4. A 2-directional control valve according to claim 3, characterised in that the radial shoulder is formed by an annular groove into which the radial bores of the main piston open.

5. A 2-directional control valve according to claim 4, characterised in that a front surface removed from the radial shoulder is designed as an inclined shoulder.

6. A 2-directional control valve according to claim 2, characterised in that the diameter of the main piston is enlarged by 3–10% by the radial shoulder.

7. A 2-directional control valve according to claim 2, characterised in that the valve bush comprises a peripheral groove in the region of the steppingly expanded portion.

8. A pilot controlled pressure reducing valve including a 2-directional control valve in accordance with claim 1, wherein the pressure at the outlet port is supplied to the spring side of the main piston via a nozzle, and the pressure at the spring side may be limited by way of a pilot control valve.

9. A pilot controlled pressure reducing valve according to claim 8, characterised in that the pilot control valve is a direct operated reducing valve.

10. A pilot controlled pressure reducing valve according to claim 8, characterised in that the pilot control valve is a pilot operated pressure reducing valve.

11. A flow control valve including an adjustable throttle valve, upstream of which a 2-directional control valve according to claim 1 is arranged as a pressure compensator, wherein the pressure downstream of the throttle valve is supplied to the spring side of the main piston of the 2-directional control valve.

* * * * *